US012772955B2

(12) United States Patent
Galvin

(10) Patent No.: US 12,772,955 B2
(45) Date of Patent: Oct. 27, 2026

(54) PORTABLE ANIMAL SHELTERS AND METHODS OF USING THE SAME

(71) Applicant: James S. Galvin, Madison, OH (US)

(72) Inventor: James S. Galvin, Madison, OH (US)

( * ) Notice: Subject to any disclaimer, the term of this patent is extended or adjusted under 35 U.S.C. 154(b) by 0 days.

(21) Appl. No.: 18/673,460

(22) Filed: May 24, 2024

(65) Prior Publication Data

US 2024/0389544 A1 Nov. 28, 2024

Related U.S. Application Data

(60) Provisional application No. 63/469,186, filed on May 26, 2023.

(51) Int. Cl.
*A01K 1/00* (2006.01)

(52) U.S. Cl.
CPC .................................. *A01K 1/0035* (2013.01)

(58) Field of Classification Search
CPC .............................. A01K 1/035; A01K 1/0035
See application file for complete search history.

(56) References Cited

U.S. PATENT DOCUMENTS 312,880 A * 2/1885 McPherson .......... A01K 13/008 54/79.2
340,332 A * 4/1886 Lewis .................. A01K 13/008 54/79.2
791,372 A * 5/1905 Seaders ................ A01K 13/008 54/79.2
838,310 A * 12/1906 Evans .................. A01K 13/008 54/79.2
5,537,954 A * 7/1996 Beeghly ............... A01K 13/006 119/850
5,918,611 A * 7/1999 Amato ................... A45B 11/02 135/96
6,439,165 B1 * 8/2002 Guard .................. A01K 1/0035 119/496
6,786,028 B1 * 9/2004 Longtin .................... B68C 5/00 54/79.2
11,116,179 B2 * 9/2021 Egan ......................... A61F 7/02
2016/0174523 A1 * 6/2016 Neveu .................. A01K 13/006 119/850
2019/0297845 A1 * 10/2019 Gilbert ................. A01K 13/008

* cited by examiner

*Primary Examiner* — Ebony E Evans

(74) *Attorney, Agent, or Firm* — UB Greensfelder LLP; Brian E. Turung

(57) ABSTRACT

Portable animal shelters, assemblies, and methods that include a base configured to receive an animal; a cover having a first portion and a second portion, wherein the first portion is releasably coupled to the second portion; and one or more thermodynamic elements configured to contact the animal, wherein the one or more thermodynamic elements are housed within a pocket that is coupled to an inner surface of the cover.

26 Claims, 13 Drawing Sheets

PORTABLE ANIMAL SHELTERS AND METHODS OF USING THE SAME

REFERENCED APPLICATIONS

The present patent application claims the benefit of U.S. Provisional Patent Application Ser. No. 63/469,186 filed on May 26, 2023 and entitled "Portable Animal Shelter", the disclosure of which is hereby incorporated by reference herein in its entirety and made part of the present U.S. utility patent application for all purposes.

TECHNICAL FIELD

The present disclosure relates generally to animal shelters and methods of using the same, and more specifically to portable animal shelters, assemblies, and methods that facilitate in shielding an animal from the outdoor elements and optionally cooling and/or warming the animal while in the shelter via one or more cooling/heating elements.

BACKGROUND OF DISCLOSURE

Animals such as dogs are commonly used by hunters to locate/track other animals being hunted and/or retrieve other animals that have been killed. In many regions of the world, hunting season is in the winter or summer months. During winter months, the temperatures can drop below freezing, exposing the hunting dog to cold temperatures for extended periods of time and increasing the risk of hypothermia. Likewise, during summer months when the temperatures are elevated, the dog can be subjected to dehydration and/or over-heating. In either situation, the health and performance of the dog is adversely affected, which can result in a hunter having to end or shorten a hunting trip and/or tend to an injured dog.

Accordingly, there remains an ongoing need for a temporary and portable animal shelter that can effectively protect an animal from the outdoor elements during hunting, while also providing for quick and easy assembly and disassembly.

SUMMARY OF DISCLOSURE

The present disclosure is directed to animal shelters and methods of using the same, and more specifically to portable animal shelters, assemblies, and methods that facilitate in shielding an animal from the outdoor elements and optionally cooling and/or warming the animal while in the shelter via one or more cooling/heating elements. In particular, one non-limiting embodiment of the present disclosure is directed to portable animal shelters including a base configured to receive an animal; a cover having a first portion and a second portion, wherein the first portion is releasably coupled to the second portion; and one or more thermodynamic elements configured to modify the temperature about the animal in the portable animal shelter, and wherein the one or more thermodynamic elements are housed within one or more pockets or insert regions in the portable animal shelter, and wherein the one or more pockets or insert regions can be coupled to an inner and/or outer surface of the cover.

In one non-limiting aspect of the present disclosure, there is provided a portable animal shelter wherein one or more securing members are coupled to a bottom side of the base, and wherein the one or more securing members are configured to secure the base to a predetermined surface. The type of securing arrangements is non-limiting (e.g., one or more opening that are configured to receive and/or be connected to ground stakes or securing anchors, one or more cords, straps or tethers that can be used to secures to a ground stake or anchor, one or more loops that are configured to receive and/or be connected to ground stakes or securing anchors, etc.).

In another and/or alternative non-limiting aspect of the present disclosure, the portable animal shelter can optionally further include one or more pieces of liquid-wicking material configured to contact one or more portion of the animal when the animal is located in the portable animal shelter, and wherein the one or more pieces of liquid-wicking material can partially or fully formed the cover and/or base of the portable animal shelter, and/or be optionally be detachably coupled to one or more regions of the inner and/or outer surface of the cover and/or base. The type of liquid-wicking material is non-limiting (e.g., synthetic, man-made fibers (e.g., synthetic, man-made fibers (e.g., polyester, polypropylene, nylon, acrylic, spandex, etc.) or natural fibers formed into fabrics have tiny spaces between their fibers that allow moisture to be drawn through). The liquid-wicking material can be connected to the cover by any means (e.g., hook and loop fastener, snaps, zipper, buttons, clamps, clips, safety pins, stitching, adhesive, heat melted connection, tape, cords, magnets, etc.). Generally, the liquid-wicking material is positioned on 1%-80% (and all values and ranges therebetween) of the inner and/or outer surface of the cover.

In another and/or alternative non-limiting aspect of the present disclosure, the portable animal shelter can optionally include one or more pockets that include one or more compartments that are configured to receive the one or more thermodynamic elements; an optional flap for one or more of the pocket that extends a portion or full length of the pocket, and wherein the flap is transitionable between an open position and a closed position; and optionally one or more coupling members that releasably secure the flap in the closed position, thereby retaining the one or more thermodynamic elements in the one or more compartments. The one or more pockets can be located on the base and/or cover of the portable animal shelter. In one non-limiting embodiment, the one or more thermodynamic elements are packs, blocks, pads, mats, or combinations thereof capable of heating, cooling, or heating and cooling. In one non-limiting aspect of the disclosure, the one or more thermodynamic elements are chemical packs that provide heating or cooling. In one non-limiting aspect of the disclosure, the one or more thermodynamic elements are cooling gel packs.

In another and/or alternative non-limiting aspect of the present disclosure, the first portion of the cover of the portable animal shelter is releasably coupled to the second portion of the cover of the portable animal shelter by one or more coupling members, and wherein the one or more coupling members are formed within the first portion and the second portion. The first and second cover portions can be releasably connected together by any means (e.g., hook and loop fastener, snaps, zipper, buttons, clamps, clips, safety pins, adhesive, tape, cords, magnets, etc.). In one non-limiting embodiment, a portion of the first and second portions can be configured to be positionable about a portion of an animal (e.g., neck of the animal, etc.) and then be releasably secured together so that the cover is at least partially releasably secure about a portion of the animal when the animal is positioned in the portable animal shelter.

In another and/or alternative non-limiting aspect of the present disclosure, one or more portion of the base and/or cover if formed of a flexible material that includes an insulation material. The base and/or cover material can be formed of a synthetic material (e.g., e.g., polyester, polypropylene, nylon, acrylic, aramid fibers, polytetrafluoroethylene (PTFE), carbon fibers, etc.), or a blend of synthetic and material materials. The type of insulation material is non-limiting (e.g., fiberglass, mineral wool, cellulose, natural fibers, polystyrene, polyisocyanurate, polyurethane, perlite, foam, phenolic foam, etc.). The thickness of the material used to form the cover and/or base and the thickness of the optional insulation material is non-limiting.

In another and/or alternative non-limiting aspect of the present disclosure, the portable animal shelter can optionally include one or more towels that are configured to contact the animal when the animal is located in the portable animal shelter, and wherein the towel is at least partially coupled to the pocket or other portion of the cover and/or base. The one or more towels can be releasably connected to the cover and/or base. The size and material used for the one or more towels in non-limiting.

In another and/or alternative non-limiting aspect of the present disclosure, the portable animal shelter can optionally include a second pocket coupled to the inner surface of the cover, and wherein the second pocket is configured to receive a second one or more thermodynamic elements. As can be appreciated, the cover can include additional pockets.

In another and/or alternative non-limiting aspect of the present disclosure, the base of the portable animal shelter is configured to receive the animal in a laying down position, and wherein the first portion and second portion are releasably coupled around a portion of the animal's head such that the one or more thermodynamic elements are positioned closely adjacent to and/or contact one or more portions of the animal.

In another and/or alternative non-limiting aspect of the present disclosure, the base is configured to receive the animal in an upright position. In one non-limiting configuration of the present disclosure, the base can optionally include a first set of tabs coupled proximate to a first end of the base; a second set of tabs coupled proximate to a second end of the base; and one or more coupling members formed on the first and second sets of tabs, wherein the one or more coupling members are configured to releasably couple the base to the cover.

In another and/or alternative non-limiting aspect of the present disclosure, the portable animal shelter can optionally further include a hood coupled to the cover, wherein the hood is configured to cover at least a portion of the animal's head. The hood can be permanently attached to the cover or be releasably connected to the cover.

In another and/or alternative non-limiting aspect of the present disclosure, the portable animal shelter can optionally further include a frame assembly that is connectable to the cover (e.g., inner surface of the cover, etc.), and wherein the frame assembly comprises one or more support members that are configured to position one or more portion or all of the cover in a vertical or upright profile. The frame can optionally be formed of or include one or more rods, tubes, slats, etc. The material used to form the frame is non-limiting (e.g., metal, plastic, wood, fiberglass, composite material, ceramic material, etc.). The one or more rods can optionally be formed of a flexible or bendable material (e.g., fiberglass, plastic, composite material, metal, wood, etc.). The cover and/or base can optionally include one or more tabs, slots, pockets, openings, etc. such that a portion of all of the frame can be connected to the cover and/or base.

In another and/or alternative non-limiting aspect of the present disclosure, the base the portable animal shelter can optionally be a separate component from the cover.

In another and/or alternative non-limiting aspect of the present disclosure, the portable animal shelter is configured for use during hunting, and wherein the animal is a hunting dog.

In another and/or alternative non-limiting aspect of the present disclosure, there is provided a portable shelter for protecting a hunting animal from outdoor elements that includes a) a base that is configured to receive a hunting animal; b) a cover that has a first portion and a second portion, and wherein the first portion can be releasably coupled to the second portion; c) one or more thermodynamic elements that are housed within a first pocket, and wherein the one or more thermodynamic elements of the first pocket are configured to be positioned closely adjacent to or contact one portion of the hunting animal when positioned in the portable shelter; d) one or more thermodynamic elements housed within a second pocket, and wherein the one or more thermodynamic elements of the second pocket are configured to be positioned closely adjacent to or contact another portion of the hunting animal when positioned in the portable shelter, and wherein the first and second pockets are positioned the cover (e.g., inner surface of the cover, etc.).

In one non-limiting object of the disclosure, there is provided a portable animal shelter that is used to facilitate in shielding an animal from the outdoor elements and optionally cooling and/or warming the animal while in the shelter via one or more cooling/heating elements.

In another and/or alternative non-limiting object of the disclosure, there is provided a portable animal shelter that is includes camouflage colors and/or print to at least partially camouflage the portable animal shelter and/or animal that is partially or fully positioned in the portable animal shelter when the portable animal shelter is positioned in the outdoors.

In another and/or alternative non-limiting object of the disclosure, there is provided a portable animal shelter that is configured for use when the animal is laying on the base of the portable animal shelter.

In another and/or alternative non-limiting object of the disclosure, there is provided a portable animal shelter that is configured for use when the animal is sitting upright on the base of the portable animal shelter.

In another and/or alternative non-limiting object of the disclosure, there is provided a portable animal shelter that includes a cover having a first portion and a second portion, wherein the first portion is releasably coupled to the second portion; and one or more thermodynamic elements are configured to modify the temperature about the animal in the portable animal shelter, and wherein the one or more thermodynamic elements are optionally housed within one or more pockets or insert regions in the portable animal shelter, and wherein the one or more pockets or insert regions can optionally be coupled to an inner and/or outer surface of the cover.

In another and/or alternative non-limiting object of the disclosure, there is provided a portable animal shelter wherein one or more securing members are coupled to a bottom side of the base, and wherein the one or more securing members are configured to secure the base to a predetermined surface.

In another and/or alternative non-limiting object of the disclosure, there is provided a portable animal shelter can optionally further include one or more pieces of liquid-wicking material configured to contact one or more portion of the animal when the animal is located in the portable animal shelter, and wherein the one or more pieces of liquid-wicking material can partially or fully formed the cover and/or base of the portable animal shelter, and/or be optionally be detachably coupled to one or more regions of the inner and/or outer surface of the cover and/or base.

In another and/or alternative non-limiting object of the disclosure, there is provided a portable animal shelter can optionally include one or more pockets that include one or more compartments that are configured to receive the one or more thermodynamic elements; an optional flap for one or more of the pocket that extends a portion or full length of the pocket, and wherein the flap is transitionable between an open position and a closed position; and optionally one or more coupling members that releasably secure the flap in the closed position, thereby retaining the one or more thermodynamic elements in the one or more compartments, and wherein the one or more pockets can be located on the base and/or cover of the portable animal shelter.

In another and/or alternative non-limiting object of the disclosure, there is provided a first portion of the cover of the portable animal shelter is releasably coupled to the second portion of the cover of the portable animal shelter by one or more coupling members, and wherein the one or more coupling members are formed within the first portion and the second portion.

In another and/or alternative non-limiting object of the disclosure, wherein one or more portion of the base and/or cover if formed of a flexible material that includes an insulation material and/or padding material.

In another and/or alternative non-limiting object of the disclosure, there is provided a portable animal shelter can optionally include one or more towels that are configured to contact the animal when the animal is located in the portable animal shelter, and wherein the towel is at least partially coupled to the pocket or other portion of the cover and/or base.

In another and/or alternative non-limiting object of the disclosure, there is provided a portable animal shelter wherein the base of the portable animal shelter is configured to receive the animal in a laying down position, and wherein the first portion and second portion are releasably coupled around a portion of the animal's head such that the one or more thermodynamic elements are positioned closely adjacent to and/or contact one or more portions of the animal.

In another and/or alternative non-limiting object of the disclosure, there is provided a portable animal shelter wherein the base is configured to receive the animal in an upright position. In one non-limiting configuration of the present disclosure, the base can optionally include a first set of tabs coupled proximate to a first end of the base; a second set of tabs coupled proximate to a second end of the base; and one or more coupling members formed on the first and second sets of tabs, wherein the one or more coupling members are configured to releasably couple the base to the cover.

In another and/or alternative non-limiting object of the disclosure, there is provided a portable animal shelter that optionally includes a hood coupled to the cover, wherein the hood is configured to cover at least a portion of the animal's head.

In another and/or alternative non-limiting object of the disclosure, there is provided a portable animal shelter wherein the portable animal shelter can optionally further include a frame assembly that is connectable to the cover, and wherein the frame assembly comprises one or more support members that are configured to position one or more portion or all of the cover in a vertical or upright profile.

In another and/or alternative non-limiting object of the disclosure, there is provided a portable animal shelter wherein the base the portable animal shelter can optionally be a separate component from the cover.

In another and/or alternative non-limiting object of the disclosure, there is provided a portable animal shelter for protecting a hunting animal from outdoor elements that includes a) a base that is configured to receive a hunting animal; b) a cover that has a first portion and a second portion, and wherein the first portion can be releasably coupled to the second portion; c) one or more thermodynamic elements that are housed within a first pocket, and wherein the one or more thermodynamic elements of the first pocket are configured to be positioned closely adjacent to or contact one portion of the hunting animal when positioned in the portable shelter; d) one or more thermodynamic elements housed within a second pocket, and wherein the one or more thermodynamic elements of the second pocket are configured to be positioned closely adjacent to or contact another portion of the hunting animal when positioned in the portable shelter, and wherein the first and second pockets are positioned the cover.

These and other objects and advantages will become apparent to those skilled in the art upon reading and following the description taken together with the accompanying drawings.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIGS. 4A-4B depict a non-limiting exemplary towel configured for use with the portable shelter of FIG. 1, wherein FIG. 4A is a top down view of the towel, and wherein FIG. 4B is a bottom view of the towel.

DETAILED DESCRIPTION OF NON-LIMITING EMBODIMENTS

Figure 1:
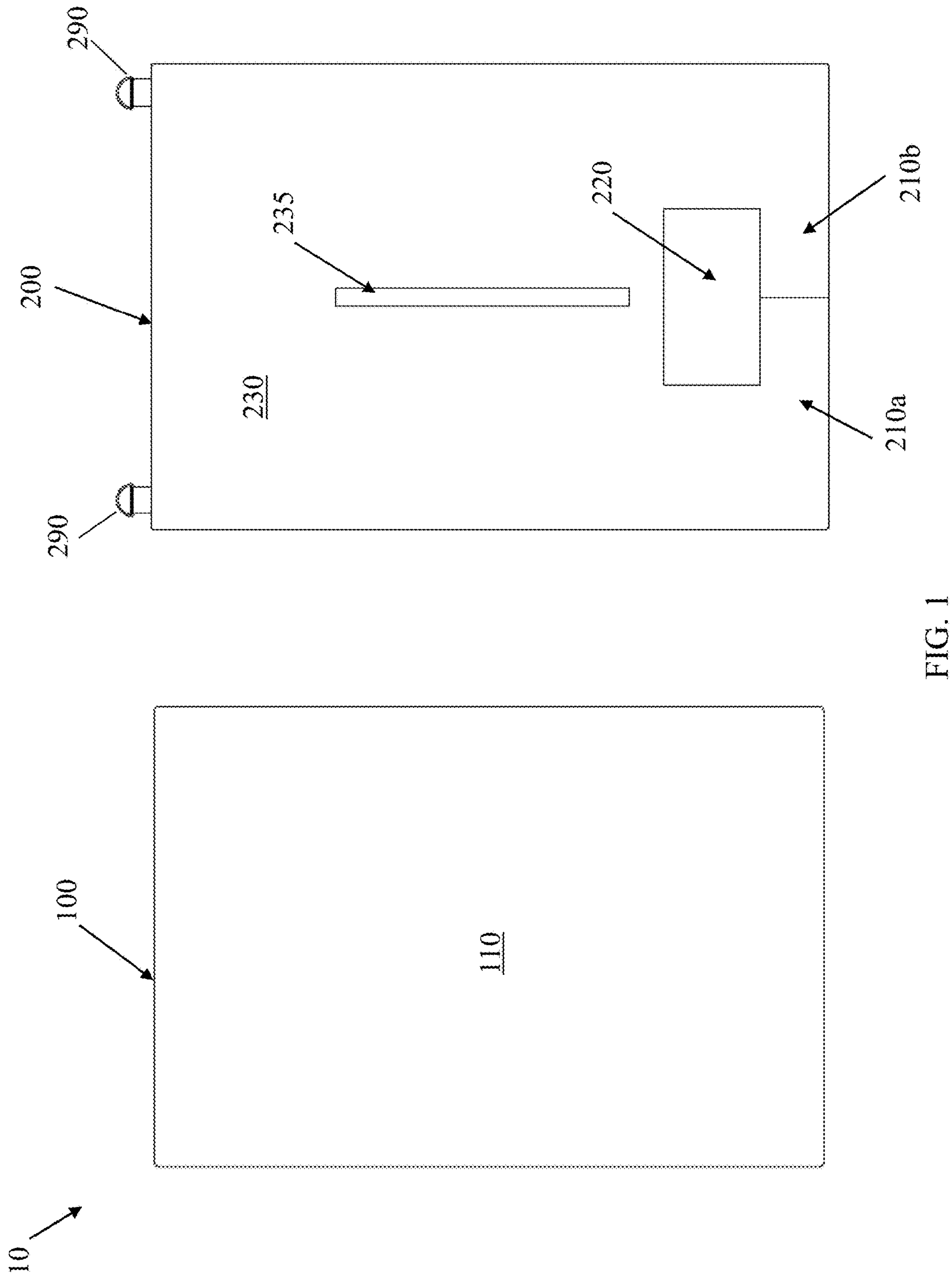
FIG. 1 depicts a non-limiting example implementation of a portable animal shelter comprising a base and a cover.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

For the sake of simplicity, the attached figures may not show the various ways (readily discernable, based on this disclosure, by one of ordinary skill in the art) in which the disclosed system, method and apparatus can be used in combination with other systems, methods and apparatuses. Additionally, the description sometimes uses terms such as "produce" and "provide" to describe the disclosed method. These terms are abstractions of the actual operations that can be performed. The actual operations that correspond to these terms can vary depending on the particular implementation and are, based on this disclosure, readily discernible by one of ordinary skill in the art.

One or more implementations of the subject application will now be described with reference to the attached figures, wherein like reference numerals are used to refer to like elements throughout.

Non-limiting example implementations of the disclosed assemblies and methods provide portable animal shelters that are configured to protect an animal such as a dog from the harsh outdoor elements (e.g., cold temperatures, hot temperatures, rain, sleet, snow, hail, wind, sun, etc.) and can optionally include thermodynamic elements such as cooling and/or warming elements (e.g. chemically activated packs, blocks, pads, or mats capable of heating, cooling, and/or heating and cooling; ice-filled packs, pads, blocks, or mats; gel-based blocks, pads, or mats, etc.) to cool and/or warm the animal while the animal is in the animal shelter. The portable animal shelters disclosed herein can be quickly and easily assembled and disassembled, and can be easily and conveniently moved to a desired location. The portable animal shelter is particularly useful for protecting a hunting dog while a hunter hunts prey in warm and cold environments and will be particularly described with reference thereto; however, it will be appreciated that the portable animal shelter can be used for other animals (e.g., cats, non-hunting dogs, etc.) in other types of uses (e.g., camping, picnic, general outdoor use, etc.). The portable animal shelter can include marking and/or colors to facilitate in camouflaging the portable animal shelter when being used. As will be discussed herein, the disclosed portable animal shelters can include: (i) a low-profile configuration for use when the hunting dog is to lay down within the animal shelter; and/or (ii) a pop-up or stand-up/vertical profile configuration for use when the hunting dog is to sit or stand upright within the animal shelter. The desired configuration of the portable animal shelter may be chosen based on the hunters specific hunting style for that occasion (e.g., low profile configuration may be used when using coffin or layout blinds, etc.).

Figure 2:
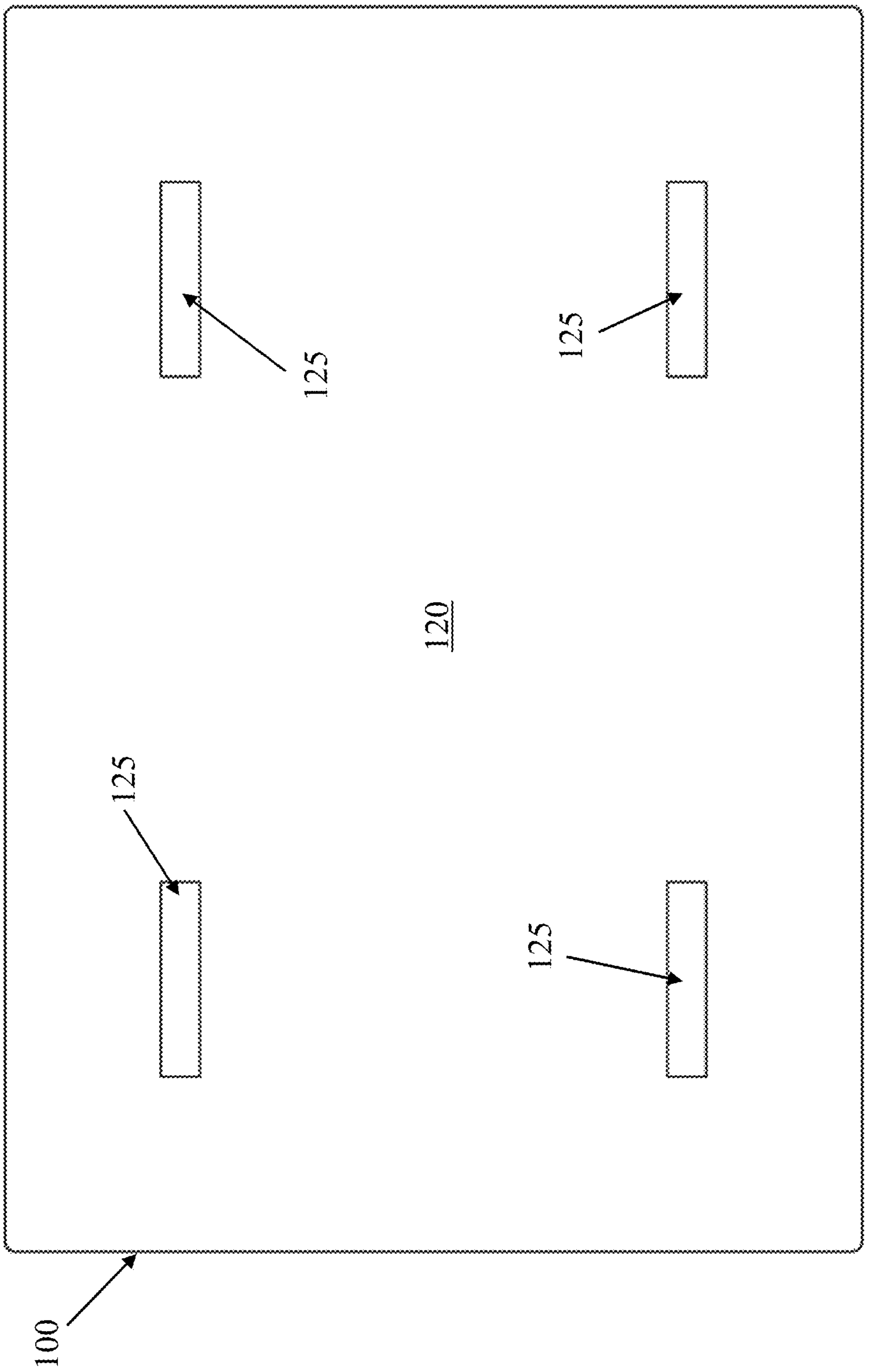
FIG. 2 is a bottom view of the base of FIG. 1.
Figure 3:
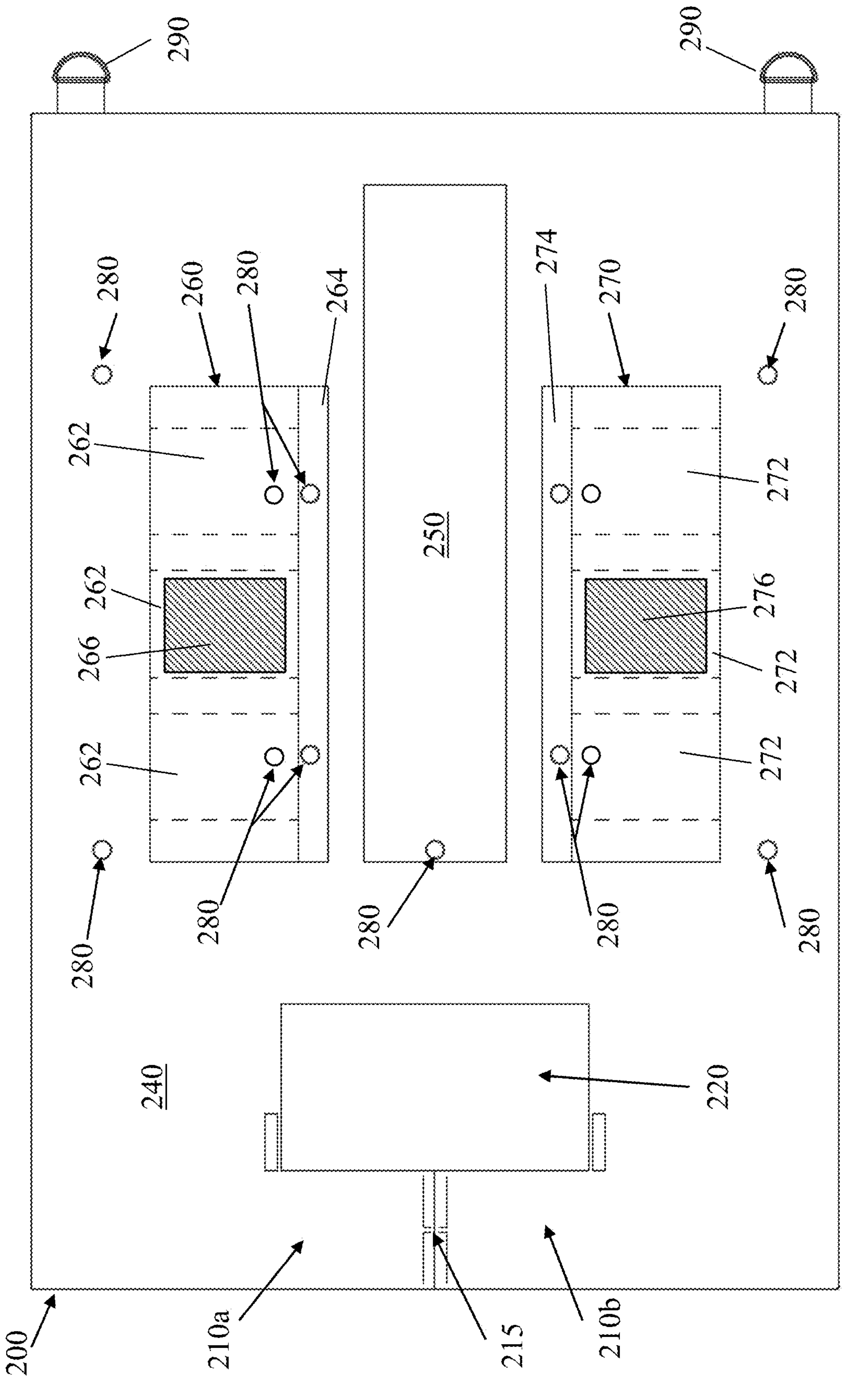
FIG. 3 is a bottom view of the cover of FIG. 1.
Figure 12:
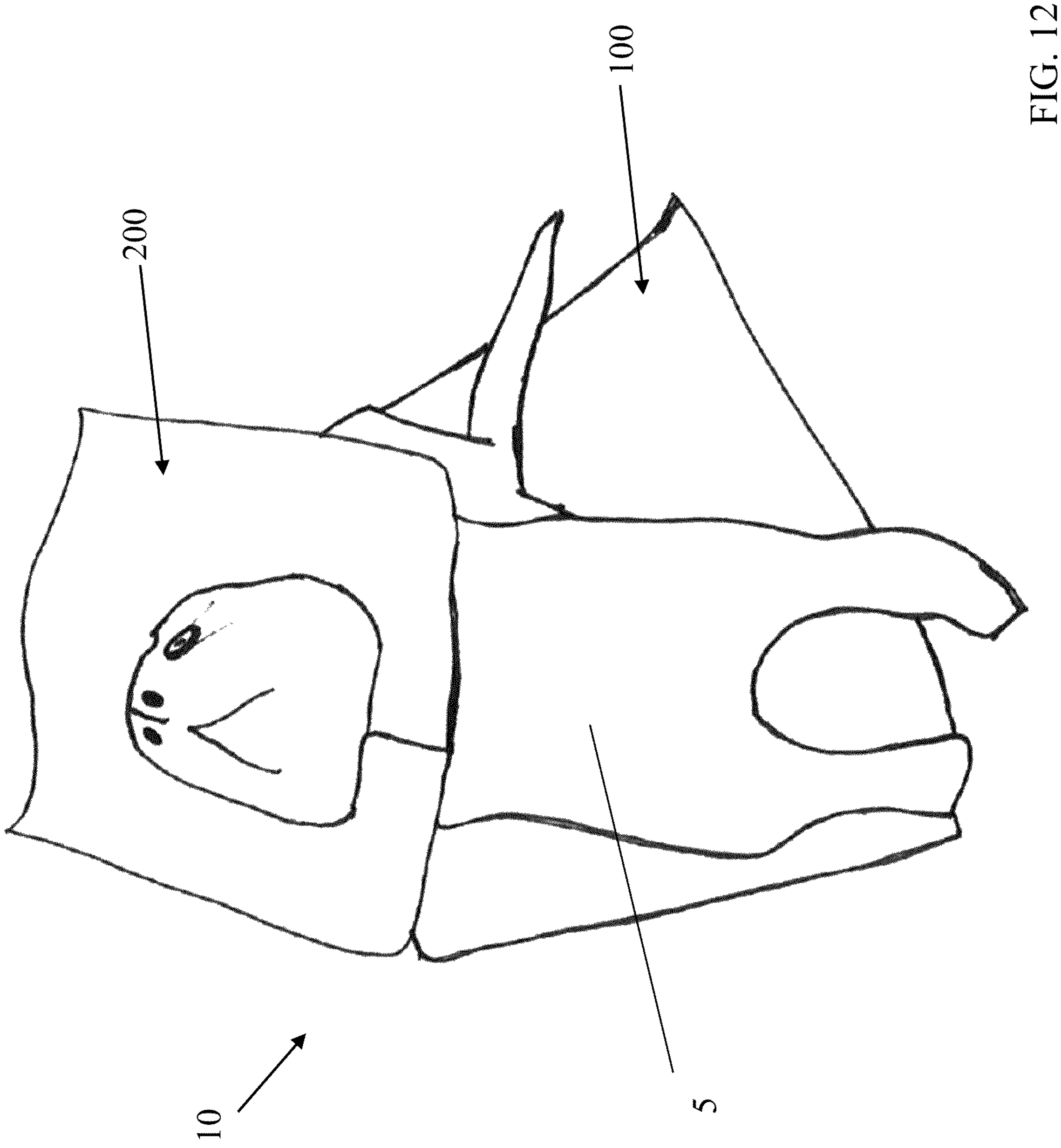
FIG. 12 depicts an exemplary, non-limiting use of the portable animal shelter of FIG. 1.

Referring now to FIG. 1, there is illustrated a non-limiting implementation of a portable animal shelter 10 comprising a base 100 and a cover 200, shown in a disassembled configuration. FIG. 2 is a bottom view of the base 100 of FIG. 1. FIG. 3 is a bottom view of the cover 200 of FIG. 1. FIG. 12 is a non-limiting exemplary use of the portable animal shelter 10 on an exemplary dog 5.

With reference to FIGS. 1-3 and 12, the portable animal shelter 10, when fully assembled, can be configured to create a low-profile arrangement that is used to at least partially cover and/or to protect an animal/dog 5 laying down within the portable animal shelter 10 (see FIG. 12 specifically). The exemplary portable animal shelter 10 includes the base 100 and the cover 200. The base 100 has a top side 110 and a bottom side 120, wherein one or more securing members 125 (e.g. straps, elastic straps, handles, hooks, rings, zipper, hook and loop fastener, magnets, openings, etc.) are coupled to or positioned in the bottom side 120 at predetermined locations. In one non-limiting embodiment, the one or more securing members 125 are configured to secure the base 100 in place (e.g. secure to ground/land, secure to a hunting stand, etc.) and/or inhibit or prevent the base 100 from moving/being blown away. The size, number, configuration, and/or location placement of the securing members 125 are non-limiting. In the present non-limiting embodiment, the base 100 is substantially rectangular; however, it is to be appreciated that the base 100 can be any shape, including but not limited to, trapezoidal, square, circular, elliptical, triangular, and/or polygonal.

Still referring to FIGS. 1-3 and 12, the cover 200 include a first portion 210*a* and a second portion 210*b* that can be releasably connected together to define an opening 220 that is configured to receive the head/neck of the animal/dog 5. The first and second portions 210*a*, 210*b* of the cover 200 are releasably coupled together by one or more couplers 215 (e.g. magnets, magnetic bars, snaps, clips, zippers, hook-and-loop fasteners, releasable adhesive connection, buttons, rope/twine, etc.) disposed/formed within the first and/or second portions 210*a*, 210*b*.

The cover 200 further includes an outer side 230 and an inner side 240. As shown in FIG. 1, the outer side 230 of the cover 200 optionally includes one or more exemplary handles 235 (e.g. straps, elastic straps, hooks, rings, etc.) at a predetermined location, that are configured to aid in carrying/transporting the cover 200 and/or the shelter 10 and/or support camouflage elements (e.g., corn stalks, branches, etc.) on the exterior of the shelter 10. The size, configuration, and/or location placement of the handles 235, when used, are non-limiting.

Still referring to FIGS. 1-3 and 12, the inner side 240 of the cover 200 optionally includes one or more pieces (e.g. strips, circular pieces, polygonal pieces, etc.) of a wicking material 250, a first pocket 260, and a second pocket 270. In the present non-limiting embodiment, the wicking material 250, when used, is fastened on a predetermined portion of the inner side 240 (e.g., 0.1-99.99% of the inner surface and all values and ranges therebetween); however, it is to be appreciated that the wicking material 250 can be fastened on the entirety of the inner side 240. It is to be appreciated that the wicking material can be permanently fastened or removably fastened to the inner side 240 by, for example, hook-and-loop fasteners, zipper, buttons, snaps, clips, rope or twine, releasable adhesive connection, buttons, magnets, etc. The wicking material 250, when used, is configured to wick away moisture from the interior of the portable animal shelter 10. Such wicking material 250 can optionally be used to facilitate the drying of the animal/dog 5 when in the portable animal shelter 10. In the present non-limiting configuration, the wicking material 250 is positioned on the inner side 240 of the cover 200 such that the material 250 contacts an outer portion of the animal/dog 5 (e.g., the animal's back, spine, belly, legs, etc.) when in the potable animal shelter 10. As can be appreciated, on or more portions or all of the cover 200 and/or base 100 can optionally be formed of a wicking material. As also can be appreciated, on or more portions or all of the cover 200 and/or base 100 can optionally include a padding layer and/or insulation layer that is partially or fully encapsulated in in the cover 200 and/or base 100.

In the present non-limiting embodiment, the first and/or second pockets 260, 270, when used, each include one or more compartments 262, 272 that are configured to receive one or more heating and/or cooling elements 266, 276. The first and/or second pockets 260, 270 can optionally include openable and closeable flaps 264, 274 that are configured to retain the heating and/or cooling elements 266, 276 within their respective compartments 262, 272. In one non-limiting embodiment, the compartments 262, 272 are separated from their like compartments 262, 272 by stitching or similar separating means (e.g. zippers, hook-and-loop fasteners, releasable adhesive connection, buttons, rope/twine, etc.). The flaps 264, 274 can be releasably secured in a closed position by any type of fastening member 280 (e.g., hook and loop fastener, zipper, snaps, clips, rope or twine, releasable adhesive connection, buttons, magnets, etc.). One or more fastening members 280 can also be disposed at one or more predetermined locations on the inner side 240 of the cover 200, and optionally be configured to receive an exemplary towel 300, as disused in greater detail below.

The first and second pockets 260, 270 are optionally positioned on the inner side 240 of the cover 200 such that: (i) the first pocket 260, when used, that contains the heating and/or cooling element 266 is positioned closely adjacent to (e.g., within 0.001-5 inches and all values and ranges therebetween) or contacts a portion of the animal/dog 5 positioned in the potable animal shelter 10; and (ii) the second pocket 270, when used, that contains the heating and/or cooling element 276 is positioned closely adjacent to (e.g., within 0.001-5 inches and all values and ranges therebetween) or contacts another portion of the animal/dog 5 positioned in the potable animal shelter 10. The first and second pockets 260, 270 can have the same, or be of different, sizes, shapes, and/or configurations. As appreciated, one or more heating elements can be used to warm the animal/dog 5 while in the portable animal shelter 10, while the one or more cooling elements can be used to cool the animal/dog 5 while in the portable animal shelter 10.

Still referring to FIGS. 1-3 and 12, one or more securing members 290 (e.g. straps, elastic straps, hooks, loops, rings, magnets, clips, buttons, hook and loop fastener, etc.) can be coupled at predetermined locations to the cover 200. The one or more securing members 290 may be used, in some non-limiting examples, to secure the cover 200 in place while positioned on the animal/dog 5 (e.g. secured to ground/land, secured to a hunting stand, secured to the base 100, etc.), and/or inhibit or prevent the cover 200 from moving/being blown away or tipped. In the present non-limiting embodiment, the cover 200 is substantially rectangular to correspond to the shape/dimensions of the base 100; however, it is to be appreciated that the cover 200 can be any shape, including but not limited to, square, circular, elliptical, triangular, and/or polygonal.

Figure 4A:
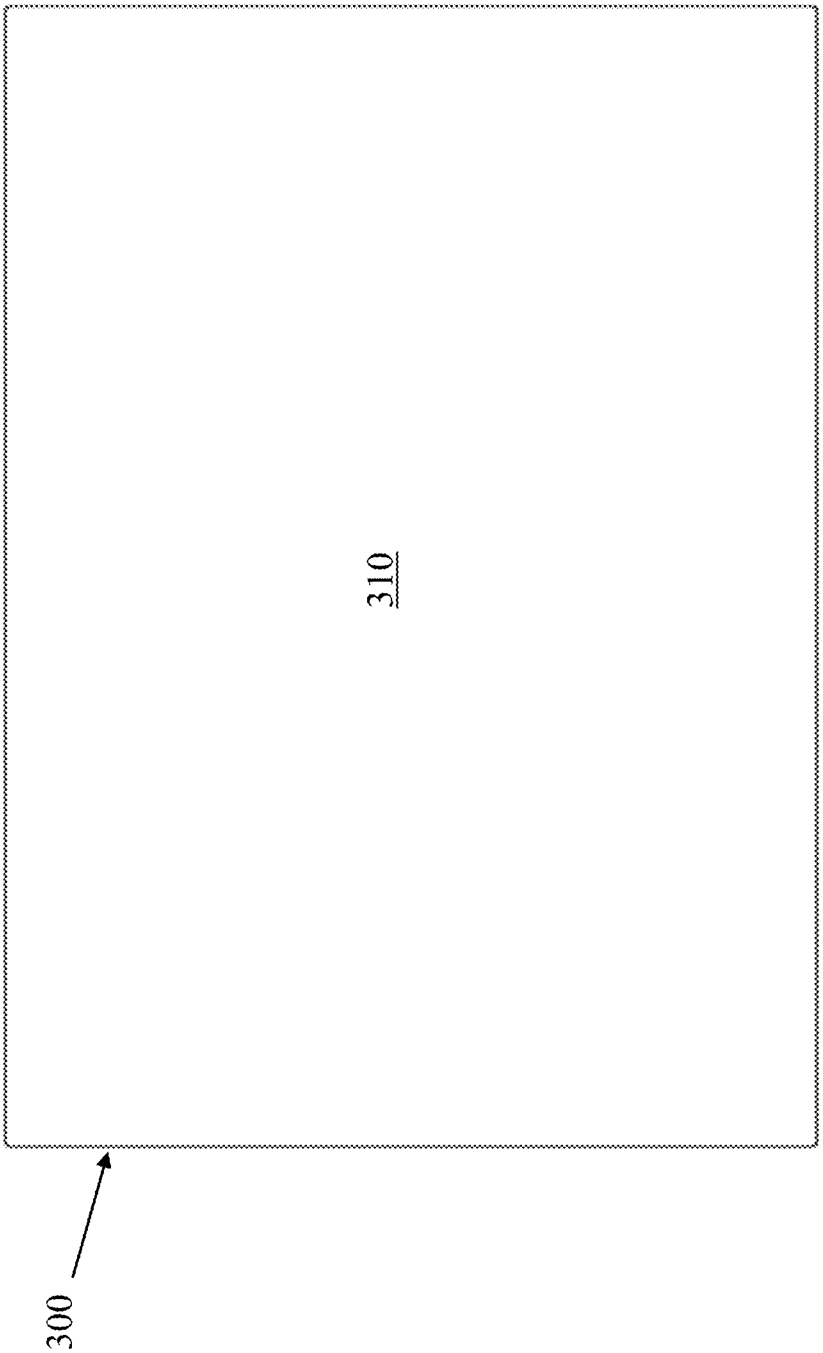
Figure 4B:
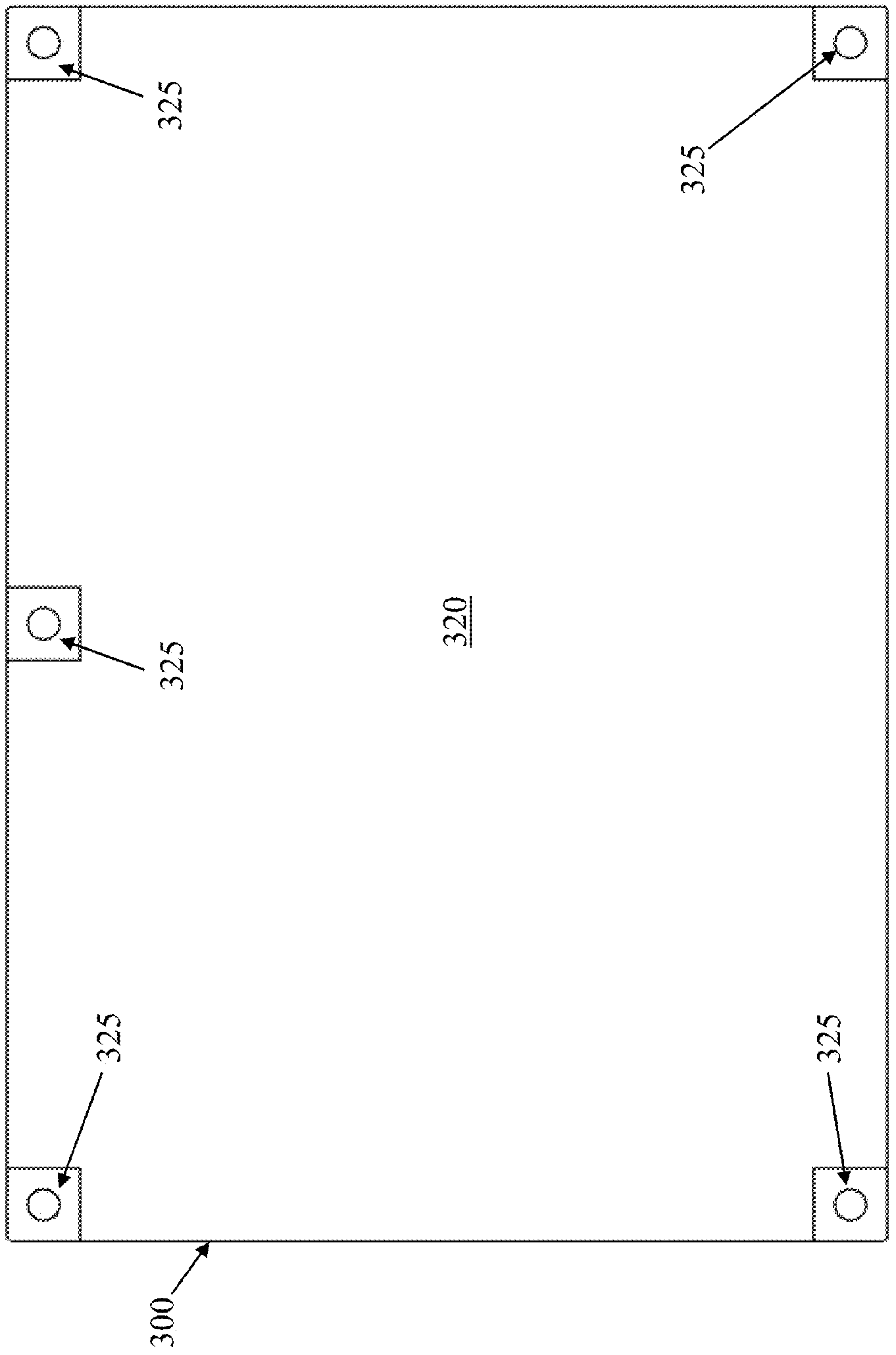

Referring now to FIGS. 4A-4B, there is illustrated a non-limiting towel 300 configured for use with the portable animal shelter 10 of FIG. 1, wherein FIG. 4A is a top-down view of the towel 300, and wherein FIG. 4B is a bottom view of the towel 300. The towel 300 comprises a first side 310 and a second side 320, wherein one or more fastening members 325 (e.g. magnets, magnetic bars, snaps, clips, zippers, hook-and-loop fasteners, releasable adhesive connection, buttons, rope/twine, etc.) can optionally be coupled to the second side 320 at predetermined locations, corresponding to the predetermined locations of the fastening members 280 disposed on the inner side 240 of the cover 200. The towel 300 can be optionally releasably or permanently connected to the inner side 240 of the cover 200. In the present non-limiting embodiment, the towel 300 can be a cooling towel that can optionally be moistened to enhance the cooling effect of the towel 300 during the cooling of the animal/dog 5 while the in the portable animal shelter 10. It is to be appreciated that the towel 300 could be heated to alternatively warm the animal/dog 5 while the in the portable animal shelter 10. In one non-limiting embodiment, the towel 300 is formed of a flexible fabric.

In one non-limiting method of assembling and using the portable animal shelter 10 illustrated in FIGS. 1-3, 4A-4B, and 12, the following steps can be performed: (i) optionally securing the bottom side 120 of the base 100 to the ground/land/stand by way of the one or more securing members 125; (ii) having the animal/dog 5 lay down on the top side 110 of the base 100; (iii) placing the cover 200 on the animal/dog 5 such that the inner side 240 of the cover 200 contacts a back portion (e.g., the back/spine, etc.) of the animal/dog 5 and the first and second portions 210*a*, 210*b* couple together around the animal/dog's 5 neck/head; and (iv) optionally securing (e.g., releasably securing, etc.) the cover 200 to the ground/land/stand by way of the one or more securing members 290, and/or optionally securing (e.g., releasably securing, etc.) the cover 200 to one or more portions of base 100. It is to be assumed that when the animal/dog 5 is to exit the portable animal shelter 10, the first and second portions 210*a*, 210*b* are uncoupled and the opening 220 is enlarged (i.e., opened) to allow the animal/dog 5 to exit the cover 200, and ultimately the portable animal shelter 10. The method can optionally include the additional steps of: (a) heating and/or cooling elements 266, 276 can optionally be positioned within their respective compartments 262, 272 prior to placing the cover 200 on the animal/dog 5; (b) the wicking material 250 can optionally be fastened to the inner side 240 of the cover 200 prior to placing the cover 200 on the animal/dog 5; and/or (c) the towel 300 can optionally be coupled to the inner side 240 of the cover 200 prior to placing the cover 200 on the animal/dog 5.

It will be appreciated that any of a variety of additional or alternative steps may be included in a method of using and/or assembling/disassembling the portable animal shelter 10.

Figure 5:
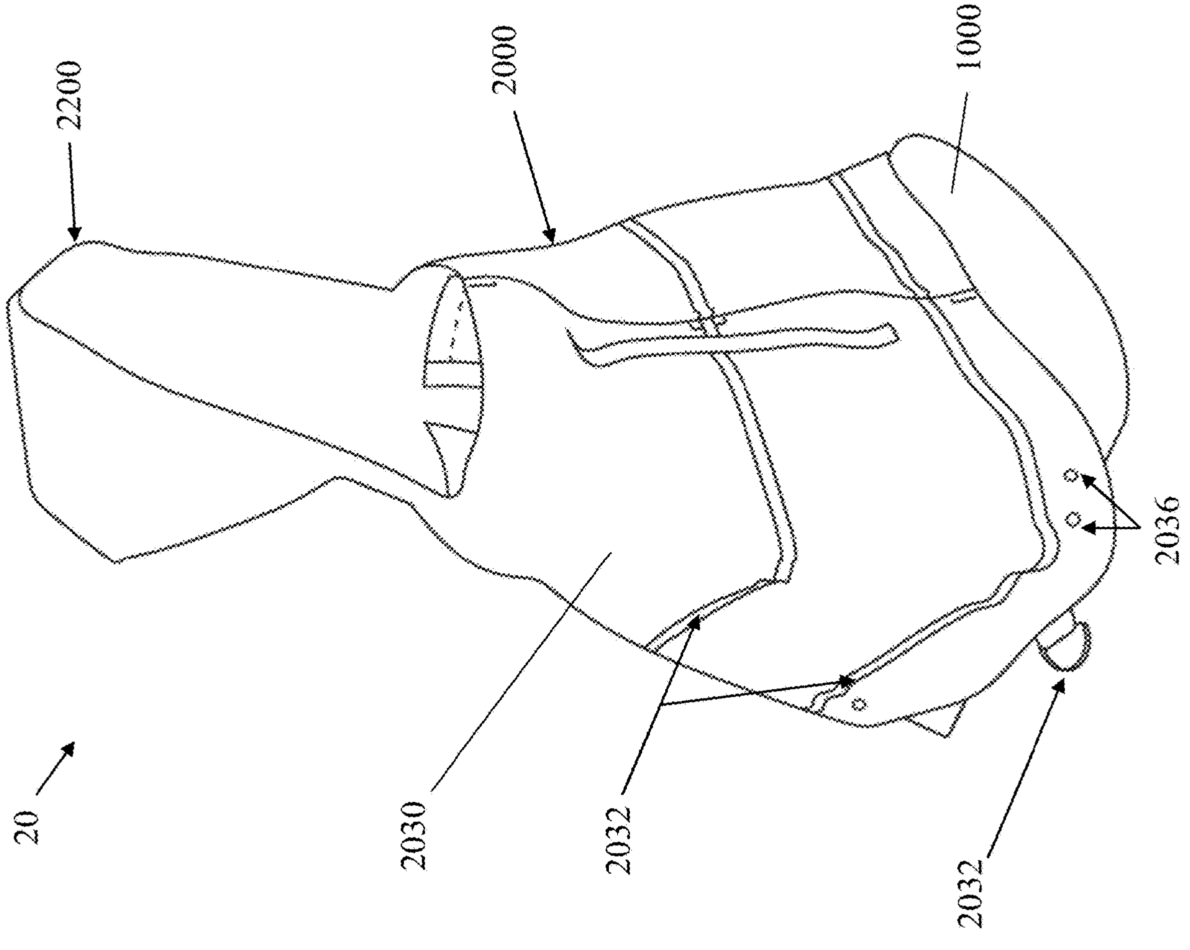
FIG. 5 depicts another non-limiting example implementation of a portable animal shelter shown in a fully assembled, closed configuration.
Figure 6:
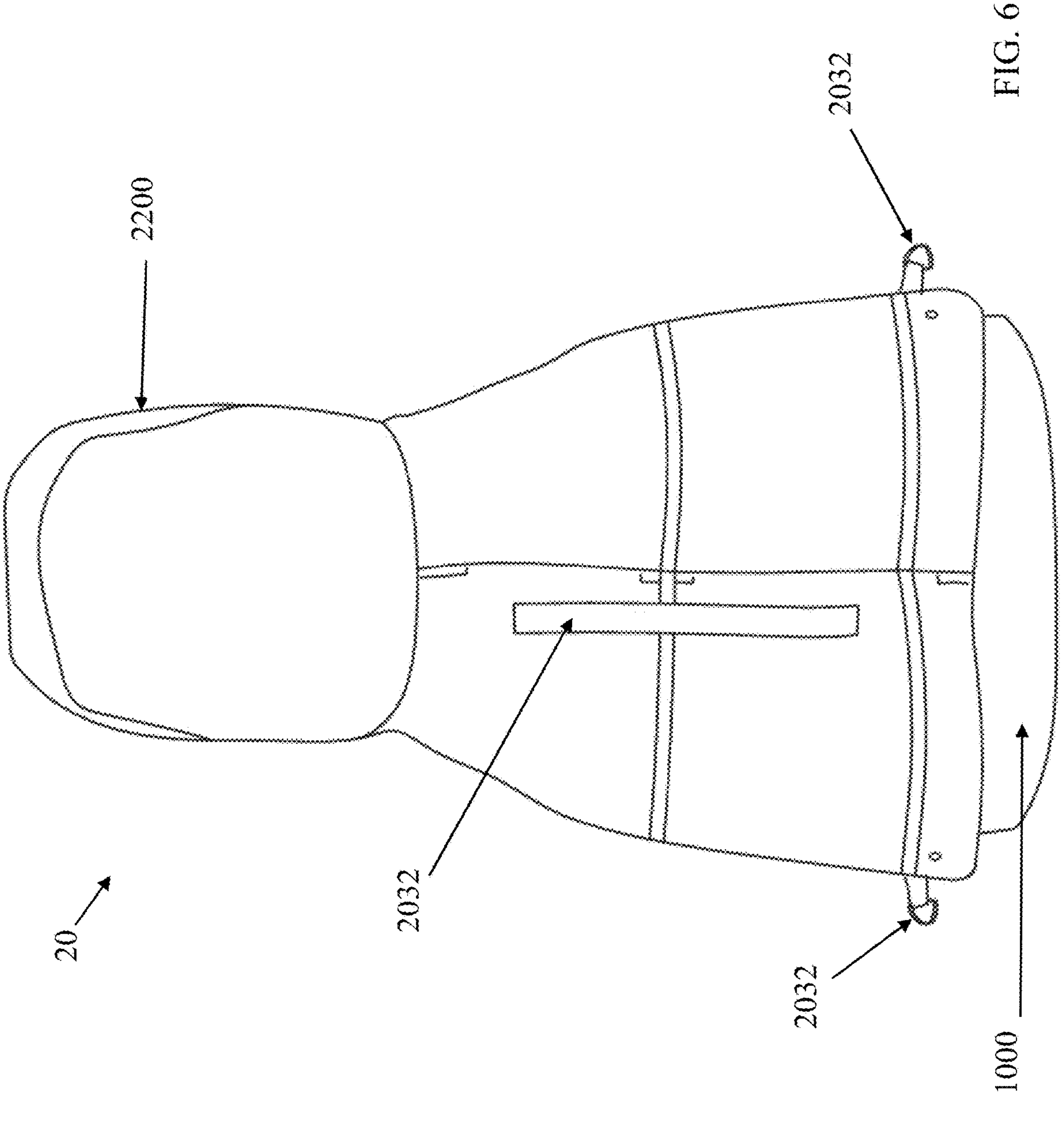
FIG. 6 is a front view of the portable animal shelter of FIG. 5.
Figure 7:
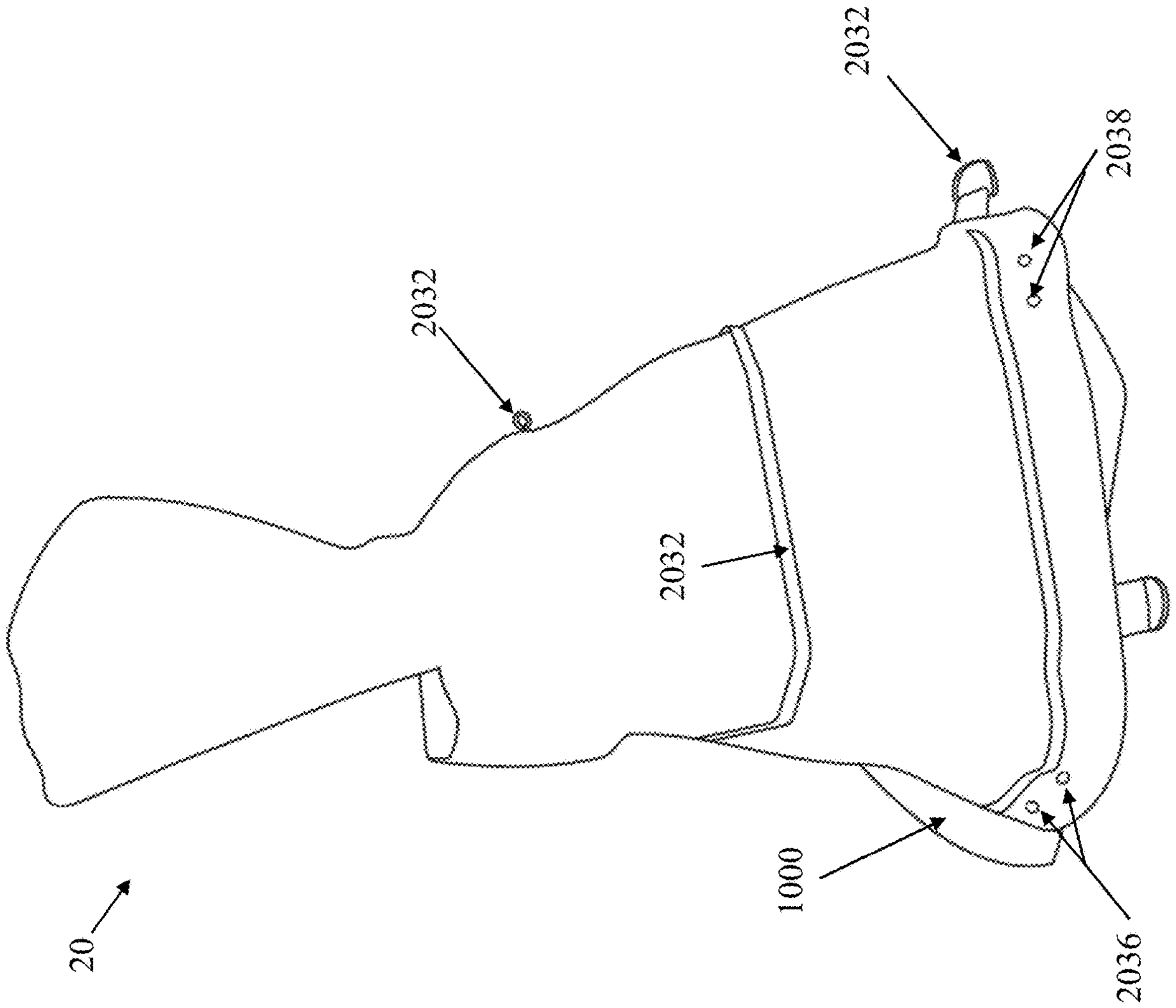
FIG. 7 is a side view of the portable animal shelter of FIG. 5.
Figure 8:
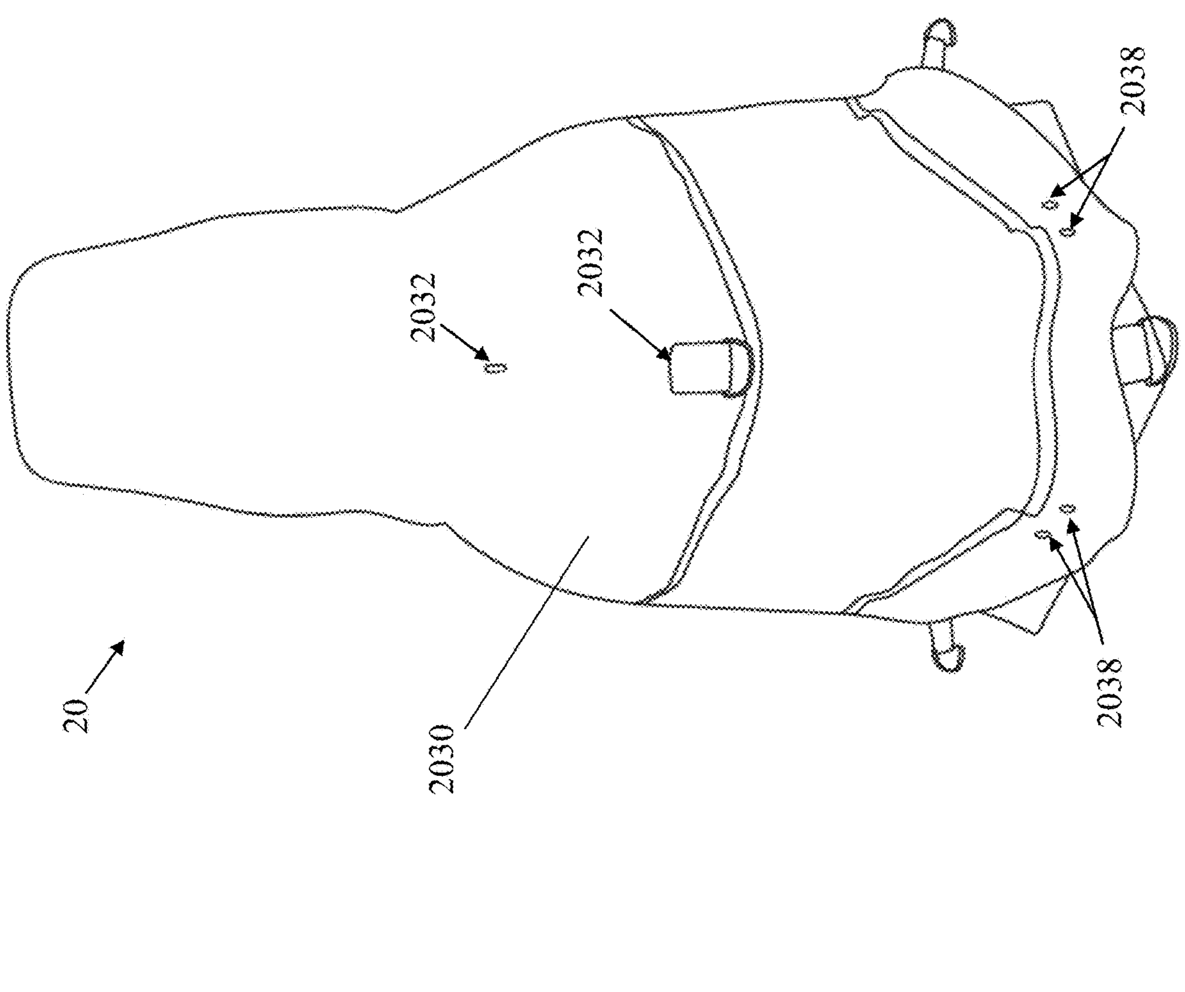
FIG. 8 is a rear view of the portable animal shelter of FIG. 5.
Figure 9:
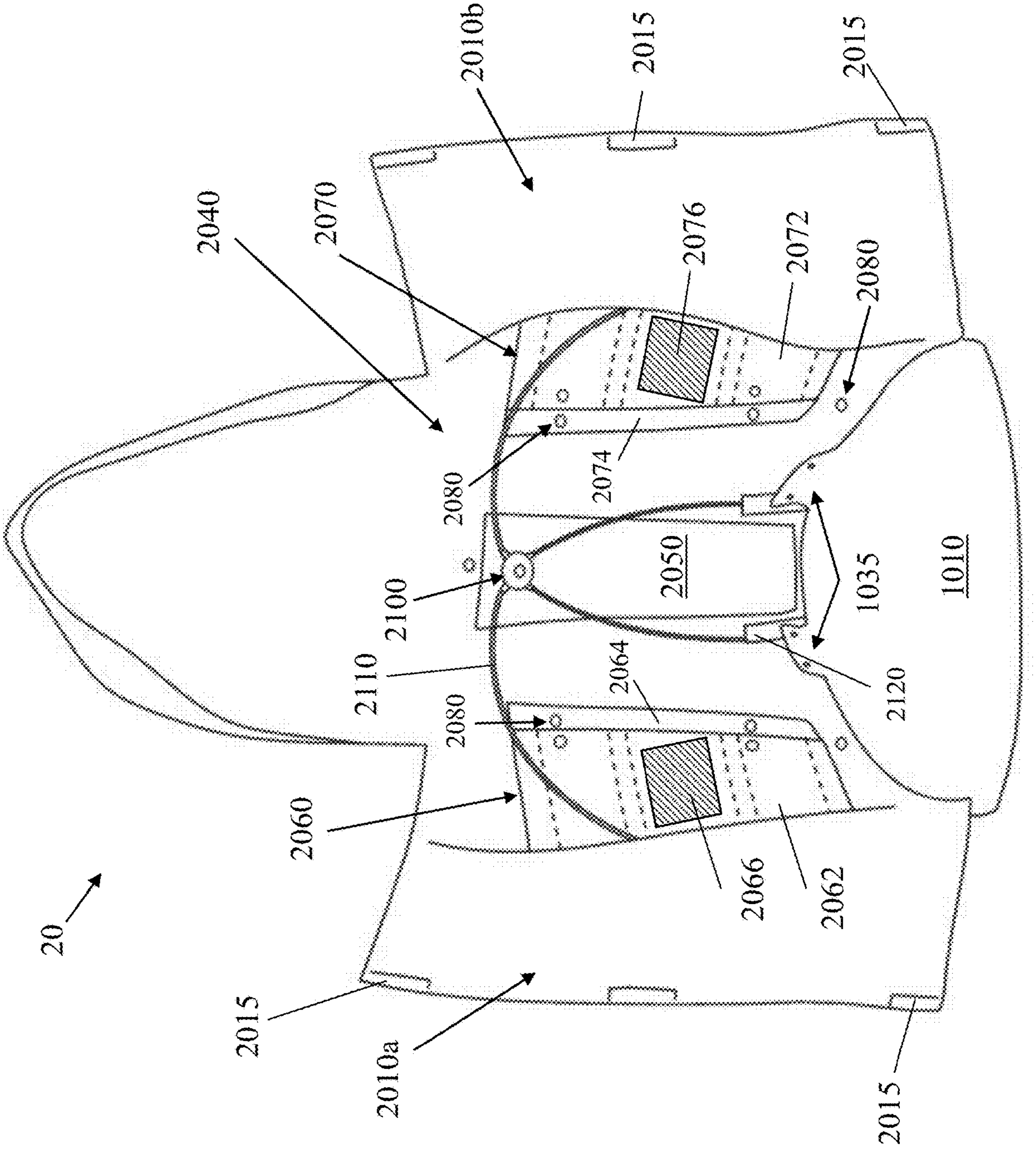
FIG. 9 is a front view of the portable animal shelter of FIG. 5 shown in a fully assembled, open configuration.
Figure 10:
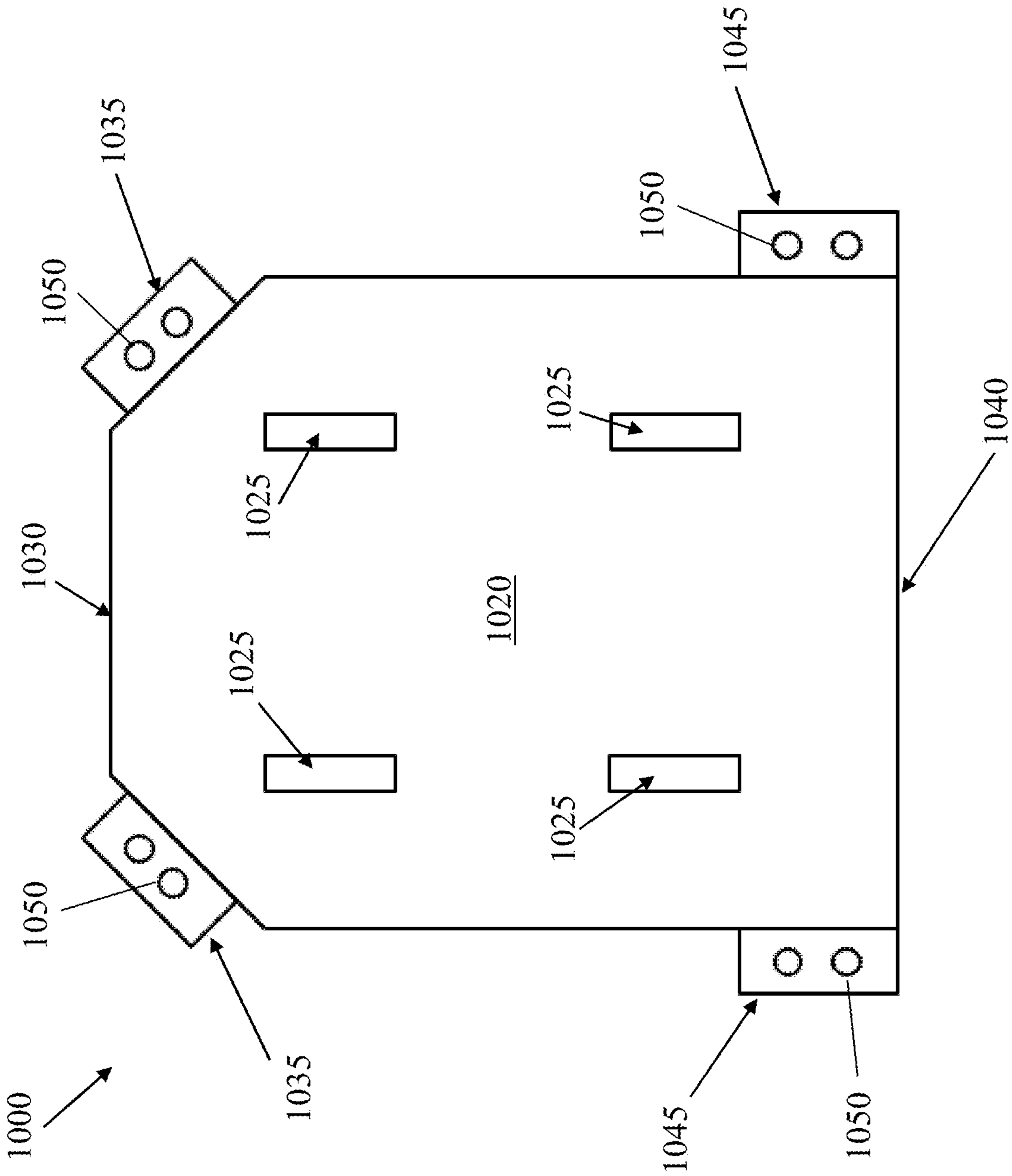
FIG. 10 is bottom view of a non-limiting exemplary base component of the portable animal shelter of FIG. 5.

Referring now to FIG. 5, there is illustrated another non-limiting implementation of a portable animal shelter 20, shown in a fully assembled, closed configuration. FIG. 6 is a front view of the portable animal shelter 20 of FIG. 5. FIG. 7 is a side view of the portable animal shelter 20 of FIG. 5. FIG. 8 is a rear view of the portable animal shelter 20 of FIG. 5. FIG. 9 is a front view of the portable animal shelter 20 of FIG. 5 shown in a fully assembled, open configuration. FIG. 10 is bottom view of a non-limiting base component 1000 of the portable animal shelter 20 of FIG. 5.

With reference to FIGS. 5-10, the portable animal shelter 20 includes a pop-up or stand-up profile arrangement configured to protect the animal/dog sitting or standing upright within the portable animal shelter 20. The exemplary portable animal shelter 20 includes a base 1000; a cover 2000; a frame assembly 2100 that is configured to support one or more portions of the cover 2000 when the shelter 20 is fully assembled; and an optional hood 2200 that is permanently or releasably connected to the cover 2000.

As best shown in FIGS. 9-10, the base 1000 includes a top side 1010, a bottom side 1020, a first end 1030, and a second end 1040. One or more securing members 1025 (e.g. straps, elastic straps, handles, hooks, rings, magnets, hook and loop fasteners, buttons, zippers, clips, openings, etc.) are coupled to and/or position in the bottom side 1020 at predetermined locations. In one non-limiting embodiment, the one or more securing members 1025 are configured to secure the base 1000 in place (e.g. secure to ground/land, secure to a hunting stand, etc.) and/or inhibit or prevent the base 1000 from moving/being blown away or tipped over. The size, number, configuration, and/or location placement of the one or more securing members 1025 are non-limiting. In the present non-limiting embodiment, the base 1000 optionally includes a first set of flexible tabs 1035 and a second set of flexible tabs 1045, wherein in the first set of tabs 1035 are fastened proximal to the first end 1030 and the second set of tabs 1045 are fastened proximal to the second end 1040. One or more couplers 1050 (e.g. magnets, magnetic bars, snaps, clips, zippers, hook-and-loop fasteners, releasable adhesive connection, buttons, rope/twine, etc.) may be disposed on the first set of tabs 1035 and/or the second set of tabs 1045. It is to be appreciated that the base 1000 can be any shape, including but not limited to, trapezoidal, rectangular, square, circular, elliptical, triangular, and/or polygonal.

Still referring to FIGS. 5-10, the cover 2000 includes a first portion 2010*a* and a second portion 2010*b* that are releasably coupled together by one or more couplers 2015 (e.g. magnets, magnetic bars, snaps, clips, zippers, hook-and-loop fasteners, releasable adhesive connection, buttons, rope/twine, etc.) disposed/formed within the first and/or second portions 2010*a*, 2010*b*. Uncoupling/separating the first portion 2010*a* from the second portion 2010*b* defines an opening 2020 configured to surround the animal and enable the animal to enter/exit the shelter 20 (see FIG. 9). The cover 2000 includes an outer side 2030 and an inner side 2040. As shown in FIGS. 5-8, the outer side 2030 of the cover 2000 optionally includes one or more securing arrangements 2032 (e.g. handles, straps, elastic straps, hooks, rings, openings, etc.) at a predetermined location, configured to: (i) aid in carrying/transporting the cover 2000 and/or the shelter 20; (ii) secure the cover 2000 in place while positioned on the animal (e.g. secured to ground/land, secured to a hunting stand, secured to the base 1000, etc.); (iii) inhibit or prevent the cover 2000 from moving/being blown away or tipped; and/or (iv) support camouflage elements (e.g., corn stalks, branches, etc.) on the exterior of the shelter 20. The size, configuration, and/or location placement of the securing arrangements 2032 are non-limiting.

In some non-limiting embodiments, the cover 2000 includes a first and a second set of couplers 2036, 2038 (e.g. magnets, magnetic bars, snaps, clips, zippers, hook-and-loop fasteners, releasable adhesive connection, buttons, rope/twine, etc.) that are configured to releasably or permanently couple the cover 2000 to the base 1000. In one non-limiting embodiment, the first set of couplers 2036 receive the one or more couplers 1050 disposed on the first set of tabs 1035, and the second set of couplers 2038 receive the one or more couplers 1050 disposed on the second set of tabs 1045. In one non-limiting embodiment, the first and second sets of tabs 1035, 1045 couple to the inner side 2040 of the cover by way of the first and second sets of couplers 2036, 2038. In another non-limiting embodiment, the first and second sets of tabs 1035, 1045 couple to the outer side 2030 of the cover by way of the first and second sets of couplers 2036, 2038.

As best shown in FIG. 9, the inner side 2040 of the cover 2000 can optionally include one or more pieces (e.g. strips, circular pieces, polygonal pieces, etc.) of a wicking material 2050, optionally include a first pocket 2060, and optionally include a second pocket 2070. In the present non-limiting embodiment, the wicking material 2050, when used, is fastened on a predetermined portion of the inner side 2040; however, it is to be appreciated that the wicking material 2050 can be fastened on the entirety of the inner side 2040. It is to be appreciated that the wicking material can be permanently fastened or removably fastened to the inner side 2040 by, for example, hook-and-loop fasteners, zipper, snaps, clips, rope or twine, releasable adhesive connection, buttons, magnets, etc. The wicking material 2050, when used, is configured to wick away moisture from the interior of the portable animal shelter 20. Such wicking material 2050 can optionally be used to facilitate the drying of the animal when in the portable animal shelter 20. In the present non-limiting configuration, the wicking material 2050 is positioned on the inner side 2040 of the cover 2000 such that the material 2050 is closely adjacent to or contacts an outer portion of the animal (e.g. the animal's back, spine, belly, legs, etc.) when in the portable animal shelter 20.

In the present non-limiting embodiment, the first and second pockets 2060, 2070, when used, include one or more compartments 2062, 2072 that are configured to receive one or more heating and/or cooling elements 2066, 2076. The first and second pockets 2060, 2070 can optionally include openable and closeable flaps 2064, 2074 that are configured to retain the heating and/or cooling elements 2066, 2076 within their respective compartments 2062, 2072. In one non-limiting embodiment, the compartments 2062, 2072 are separated from their like compartments 2062, 2072 by stitching or similar separating means (e.g. zippers, hook-and-loop fasteners, releasable adhesive connection, buttons, rope/twine, etc.). The flaps 2064, 2074 can be releasably secured in a closed position by any type of fastening member 2080 (e.g., hook and loop fastener, zipper, snaps, clips, rope or twine, releasable adhesive connection, buttons, magnets, etc.). One or fastening members 2080 can also be disposed at one or more predetermined locations on the inner side 2040, configured to receive an optional exemplary towel 3000, as disused in greater detail below.

In the present non-limiting embodiment, the first and second pockets 2060, 2070 are positioned on the inner side 2040 of the cover 2000 such that: (i) the first pocket 2060 containing the heating and/or cooling element 2066 is positioned closely adjacent to or contacts a portion of the animal when in the portable animal shelter 20; and (ii) the second pocket 2070 containing the heating and/or cooling element 2076 is positioned closely adjacent to or contacts another portion of the animal. The first and second pockets 2060, 2070 can have the same, or be of different, sizes, shapes, and/or configurations. As appreciated, heating elements can optionally be used to warm the animal while in the shelter 20, while cooling elements can optionally be used to cool the animal while in the shelter 20.

Still referring to FIGS. 5-10, but with specific reference to FIG. 9, the optional frame assembly 2100 can be disposed/formed within the inner side 2040 of the cover 2000. As can be appreciated, one or more portions of the optional frame assembly 2100 can be disposed/formed on the exterior of cover 2000 and/or be encapsulated within cover 2000.

In the present non-limiting embodiment, the frame assembly 2100 includes one or more support members 2110 (poles, rods, extensions, etc.) configured to support a portion or all of the cover 2000 and maintain its shape when an animal is at least partially positioned in the region formed by the cover 2000. The inner side 2040 of the cover 2000 may optionally include one or more slots 2120, openings, rings, straps, etc. configured to receive end portions of the one or more support members 2110 and/or a portion of the body of the one or more support members 2110. It is to be appreciated that the frame assembly 2100 can be either permanently or releasably connected to the cover 2000. In one non-limiting configuration, one or more of the support members 2110 are partially or fully formed from flexible fiberglass.

Still referring to FIGS. 5-10, the portable animal shelter 20 can optionally include a hood 2200 that is configured to cover at least a portion of the animal's head when in the shelter 20. The hood 2200 can be permanently or releasably coupled to the cover 2000. In one non-limiting embodiment, the hood 2200 is releasably coupled to cover 2000 by way of one or more couplings, including but not limited to, magnets, magnetic bars, snaps, clips, zippers, hook-and-loop fasteners, releasable adhesive connection, buttons, and/or rope/twine.

Figure 11:
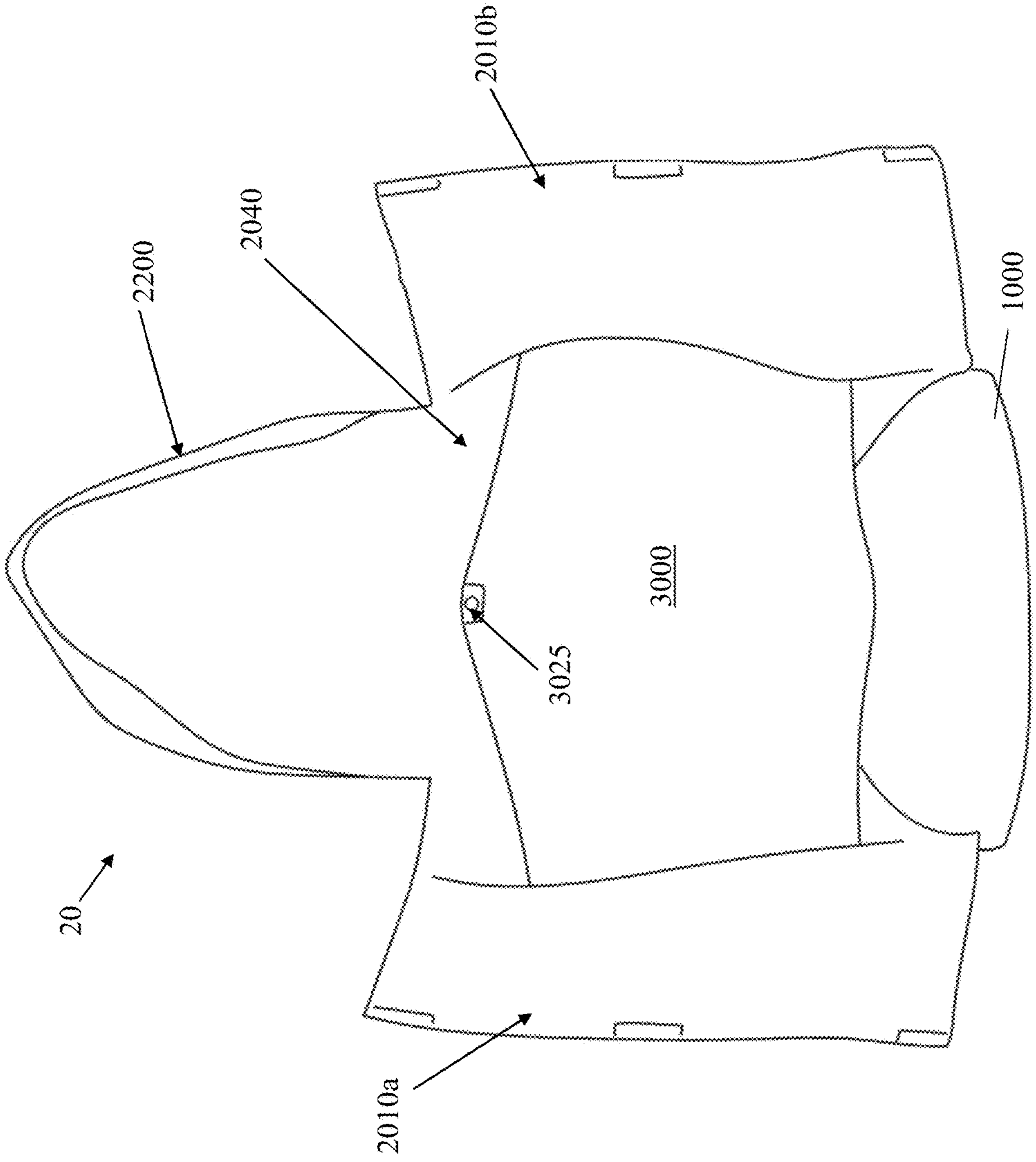
FIG. 11 depicts the portable animal shelter of FIG. 9 comprising a non-limiting exemplary towel.

Referring now to FIG. 11, there is illustrated the portable animal shelter 20 that includes an optional towel 3000. Similar to the towel 300 used with animal shelter 10, towel 3000 can optionally include one or more fastening members 3025 (e.g. magnets, magnetic bars, snaps, clips, zippers, hook-and-loop fasteners, releasable adhesive connection, buttons, rope/twine, etc.) at predetermined locations that correspond to the predetermined locations of the fastening members 2080 disposed on the inner side 2040 of the cover 2000. The towel 3000 can be optionally releasably or permanently connected to the inner side 2040 of the cover 2000. In the present non-limiting embodiment, the towel 3000 is a cooling towel that can optionally be moistened to enhance the cooling effect of the towel 3000. It is to be appreciated that the towel 3000 could be heated to alternatively warm the animal/dog. In one non-limiting embodiment, the towel 3000 is formed of a flexible fabric.

In one non-limiting method of assembling and using the portable animal shelter 20 illustrated in FIGS. 5-11, the following steps can be performed: (i) optionally securing the bottom side 1020 of the base 1000 to the ground/land/stand by way of the one or more securing members 1025; (ii) having the animal/dog sit or stand on the top side 1010 of the base 1000; (iii) placing the cover 2000 on the animal/dog such that the inner side 2040 of the cover 2000 is closely adjacent to or contacts the back/spine of the animal/dog and the first and second portions 2010*a*, 2010*b* are couple together around the animal/dog; (iv) optionally securing the base 1000 to the cover 2000 by way of the first and second sets of tabs 1035, 1045 and the first and a second set of couplers 2036, 2038; and (v) optionally placing the hood 2200 over a portion of the animal/dog's head. It is to be assumed that when the animal/dog is to exit the portable animal shelter 20, the first and second portions 2010*a*, 2010*b* are uncoupled and the opening 2020 is exposed (i.e., opened) to allow the animal/dog to exit the cover 2000, and ultimately the portable animal shelter 20.

The method optionally includes the additional steps of: (a) heating and/or cooling elements 2066, 2076 can optionally be positioned within their respective compartments 2062, 2072 prior to placing the cover 2000 on or about the animal/dog; (b) a wicking material 2050 can optionally be fastened to the inner side 2040 of the cover 2000 prior to placing the cover 2000 on or about the animal/dog; (c) a towel 3000 can optionally be coupled to the inner side 2040 of the cover 2000 prior to placing the cover 2000 on or about the animal/dog; (d) the frame assembly 2100 can optionally be coupled or connected to the cover 2000 prior to placing the cover 2000 on or about the animal/dog; and/or (e) the hood 2200 can optionally be attached to the cover 2000 prior to placing the hood 2200 over the portion of the animal/dog's head.

It will be appreciated that any of a variety of additional or alternative steps may be included in a method of using and/or assembling/disassembling the portable animal shelter 20.

The disclosed portable animal shelters 10, 20 can optionally be partially or fully formed of a water-resistant and/or waterproof material to inhibit or prevent liquid (e.g., rain, melted snow, etc.) from passing through the material. Non-limiting examples of such material can include Kevlar, Gore-Tex, polyester, nylon, etc. The disclosed portable animal shelters 10, 20 can optionally be partially or fully formed of a flexible material that easily conforms into a designed shape and/or orientation, and/or be partially or fully foldable for storage. The exterior of the disclosed portable animal shelters 10, 20 can optionally include a print, indicia, and/or design to facilitate in the camouflage of the portable animal shelter 10, 20. The disclosed portable animal shelters 10, 20 can optionally be partially or fully formed of a flexible material that can partially or fully protect the animal in the portable animal shelters 10, 20 from wind, rain, sun light, hail, etc.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall there between. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

The description of embodiments and examples has been presented for purposes of illustration and description. It is not intended to be exhaustive or limiting to the forms described. Numerous modifications are possible in light of the teachings herein. Some of those modifications have been discussed, and others will be understood by those skilled in the art. The embodiments were chosen and described in order to illustrate principles of various embodiments as are suited to particular uses contemplated. The scope is, of course, not limited to the examples set forth herein, but can be employed in any number of applications and equivalent devices by those of ordinary skill in the art.

To aid the Patent Office and any readers of this application and any resulting patent in interpreting the claims appended hereto, applicants do not intend any of the appended claims or claim elements to invoke 35 U.S.C. 112 (f) unless the words "means for" or "step for" are explicitly used in the particular claim.

What is claimed:

1. A portable animal shelter comprising:

(a) a base configured to receive an animal; said base is configured to receive the animal in a laying down position;

(b) a cover having a first portion and a second portion, wherein said first portion is releasably coupled to said second portion;

(c) one or more thermodynamic elements configured to contact the animal, wherein said one or more thermodynamic elements are housed within a pocket that is coupled to an inner surface of said cover; and (d) a frame assembly that is configured to support at least a portion of said cover above said base; and wherein said first portion and second portion are releasably coupled around a portion of the animal's head such that said one or more thermodynamic elements contact a side of the animal.

2. The portable animal shelter as defined in claim 1, wherein one or more securing members are coupled to a bottom side of said base, wherein said one or more securing members are configured to secure said base to a predetermined surface.

3. The portable animal shelter as defined in claim 1, further comprising one or more pieces of liquid-wicking material configured to contact the animal, wherein said one or more pieces of liquid-wicking material are coupled to said inner surface of said cover.

4. The portable animal shelter as defined in claim 1, wherein said pocket comprises:

(a) one or more compartments that are configured to receive said one or more thermodynamic elements;

(b) a flap extending a length of said pocket, wherein said flap is transitionable between an open position and a closed position; and (c) one or more coupling members that releasably secure said flap in said closed position, thereby retaining said one or more thermodynamic elements in said one or more compartments.

5. The portable animal shelter as defined in claim 1, wherein said one or more thermodynamic elements are packs, gel-packs, blocks, pads, mats, or combinations thereof capable of heating, cooling, or heating and cooling.

6. The portable animal shelter as defined in claim 1, wherein first portion is releasably coupled to said second portion by one or more coupling members, wherein said one or more coupling members are formed within said first portion and said second portion.

7. The portable animal shelter as defined in claim 1, further comprising a towel configured to contact the animal, wherein said towel is at least partially coupled to said pocket.

8. The portable animal shelter as defined in claim 1, further comprising a second pocket coupled to said inner surface of said cover, wherein said second pocket is configured to receive a second one or more thermodynamic elements.

9. The portable animal shelter as defined in claim 1, wherein said base is separate from said cover.

10. A portable animal shelter comprising:

(a) a base configured to receive an animal;

(b) a cover having a first portion and a second portion, wherein said first portion is releasably coupled to said second portion; and (c) one or more thermodynamic elements configured to contact the animal, wherein said one or more thermodynamic elements are housed within a pocket that is coupled to an inner surface of said cover; and (d) a frame assembly coupled to said inner surface of said cover, said frame assembly comprises one or more support members that are configured to position said cover in a vertical profile; and wherein said base is configured to receive the animal in an upright position.

11. The portable animal shelter as defined in claim 10, wherein said base further comprises:

(a) a first set of tabs coupled proximate to a first end of said base;

(b) a second set of tabs coupled proximate to a second end of said base; and (c) one or more coupling members formed on said first and second sets of tabs, wherein said one or more coupling members are configured to releasably couple said base to said cover.

12. The portable animal shelter as defined in claim 10, further comprising a hood coupled to said cover, wherein said hood is configured to cover at least a portion of the animal's head.

13. The portable animal shelter as defined in claim 10, further comprising a frame assembly coupled to said inner surface of said cover, wherein said frame assembly comprises one or more support members that are configured to position said cover in a vertical profile.

14. A portable shelter for protecting a hunting animal from outdoor elements comprising:

(a) a base configured to receive a hunting animal;

(b) a cover having a first portion and a second portion, wherein said first portion is releasably coupled to said second portion;

(c) one or more thermodynamic elements housed within a first pocket, wherein said one or more thermodynamic elements of said first pocket are configured to contact a first side of the hunting animal; and (d) one or more thermodynamic elements housed within a second pocket, wherein said one or more thermodynamic elements of said second pocket are configured to contact a second side of the hunting animal; and (e) one or more of i) a frame assembly that engages said inner surface of said cover, and wherein said frame assembly includes one or more support members that are configured to maintain a portion of said cover above said base, and/or ii) said cover includes a plurality of outer securing arrangement on an outer surface of said cover, and wherein said plurality of outer securing arrangement are configured to support camouflage elements on said outer surface of said cover; and wherein said first and second pockets are coupled to an inner surface of said cover.

15. The portable shelter as defined in claim 14, further comprising one or more pieces of liquid-wicking material configured to contact a portion of the hunting animal's back, wherein said one or more pieces of liquid-wicking material are coupled to said inner surface of said cover.

16. The portable shelter as defined in claim 14, wherein (a) said first pocket comprises:

(i) one or more compartments that are configured to receive said one or more thermodynamic elements;

(ii) a flap extending a length of said first pocket, wherein said flap is transitionable between an open position and a closed position; and (iii) one or more coupling members that releasably secure said flap in said closed position, thereby retaining said one or more thermodynamic elements in said one or more compartments, and (b) said second pocket comprises:

(i) one or more compartments that are configured to receive said one or more thermodynamic elements;

(ii) a flap extending a length of said second pocket, wherein said flap is transitionable between an open position and a closed position; and (iii) one or more coupling members that releasably secure said flap in said closed position, thereby retaining said one or more thermodynamic elements in said one or more compartments.

17. The portable shelter as defined in claim 14, wherein said one or more thermodynamic elements of said first and second pockets are packs, gel-packs, blocks, pads, mats, or combinations thereof capable of heating, cooling, or heating and cooling.

18. The portable shelter as defined in claim 14, further comprising a towel configured to contact a portion of the hunting animal's back, wherein said towel is at least partially coupled to said first pocket and said second pocket.

19. A portable animal shelter comprising:

(a) a base configured to receive at least a portion of an animal;

(b) a cover that includes a first flap portion and a second flap portion; said first and second flap portions are releasably coupled to one another; said cover includes a plurality of outer securing arrangement on an outer surface of said cover, and wherein said plurality of outer securing arrangement are configured to support camouflage elements on said outer surface of said cover;

(c) one or more of i) one or more thermodynamic elements that are configured to positioned closely adjacent to or in contact with at least a portion of the animal when the animal is positioned at least partially within said portable animal shelter, and wherein said one or more thermodynamic elements are releasably secured or releasably positioned on said cover and/or said base, ii) one or more pieces of liquid-wicking material that are configured to contact at least a portion of the animal when the animal is positioned at least partially within said portable animal shelter, and wherein said one or more pieces of liquid-wicking material are secured or positioned on said cover and/or said base, and/or iii) one or more towels that are configured to positioned closely adjacent to or in contact with at least a portion of the animal when the animal is positioned at least partially within said portable animal shelter, and wherein said one or more towels are releasably secured or releasably positioned on said cover and/or said base; and (d) a frame assembly that engages said inner surface of said cover, and wherein said frame assembly includes one or more support members that are configured to maintain a portion of said cover above said base.

20. The portable animal shelter as defined in claim 19, wherein said base is releasably connectable to said cover.

21. The portable animal shelter as defined in claim 19, wherein said base includes one or more securing members; said one or more securing members are coupled to or at least partially positioned on a bottom side of said base, and wherein said one or more securing members are configured to secure said base to a predetermined surface.

22. The portable animal shelter as defined in claim 19, wherein said portable animal shelter includes said one or more thermodynamic elements; said one or more thermodynamic elements are releasably positioned in a first pocket that is positioned or formed in said cover and/or base; said first pocket includes (a) one or more compartments that are configured to receive said one or more thermodynamic elements; (b) a flap that extends a portion or full length of said first pocket, wherein said flap is transitionable between an open position and a closed position; and (c) one or more coupling members that releasably secure said flap in said closed position to facilitate in retaining said one or more thermodynamic elements in said one or more compartments; said one or more thermodynamic elements are packs, gel packs, blocks, pads, mats, or combinations thereof capable of heating, cooling, or heating and cooling.

23. The portable animal shelter as defined in claim 22, wherein said portable animal shelter includes a second pocket that is positioned or formed in said cover and/or base; said second pocket includes (a) one or more compartments that are configured to receive said one or more thermodynamic elements; (b) a flap that extends a portion ore full length of said second pocket, wherein said flap is transitionable between an open position and a closed position; and (c) one or more coupling members that releasably secure said flap in said closed position to facilitate in retaining said one or more thermodynamic elements in said one or more compartments.

24. The portable animal shelter as defined in claim 19, wherein said base is configured to a) receive the animal in a laying down position, or b) said base is configured to receive the animal in an upright position; and wherein said first flap portion and second flap portion are configured to be releasably coupled around a portion of the animal's head such that said one or more thermodynamic elements, said one or more pieces of liquid-wicking material, and/or said one or more towels are positioned closely adjacent to or contact a side of the animal while said first flap portion and second flap portion are releasably coupled around a portion of the animal's head.

25. The portable animal shelter as defined in claim 19, further comprising a hood coupled to said cover; said hood is configured to cover at least a portion of the animal's head when the animal is positioned in said portable animal shelter.

26. A portable animal shelter comprising:

(a) a base configured to receive at least a portion of an animal; said base is configured to receive the animal in an upright position by use of a frame assembly; said frame assembly is releasably connected to a portion of said cover; said frame assembly includes one or more support members that are configured to position at least a portion of said cover in a vertical profile that at least a portion of said cover is supported above a top surface of said base;

(b) a cover that includes a first flap portion and a second flap portion; said first and second flap portions are releasably coupled to one another;

(c) one or more of i) one or more thermodynamic elements that are configured to positioned closely adjacent to or in contact with at least a portion of the animal when the animal is positioned at least partially within said portable animal shelter, and wherein said one or more thermodynamic elements are releasably secured or releasably positioned on said cover and/or said base, ii) one or more pieces of liquid-wicking material that are configured to contact at least a portion of the animal when the animal is positioned at least partially within said portable animal shelter, and wherein said one or more pieces of liquid-wicking material are secured or positioned on said cover and/or said base, and/or iii) one or more towels that are configured to positioned closely adjacent to or in contact with at least a portion of the animal when the animal is positioned at least partially within said portable animal shelter, and wherein said one or more towels are releasably secured or releasably positioned on said cover and/or said base.

* * * * *